United States Patent
Morikawa et al.

(10) Patent No.: US 10,690,067 B2
(45) Date of Patent: Jun. 23, 2020

(54) WASTE GATE VALVE CONTROL METHOD AND CONTROL DEVICE

(71) Applicant: NISSAN MOTOR CO., LTD., Yokohama, Kanagawa (JP)

(72) Inventors: Masashi Morikawa, Kanagawa (JP); Mitsuhiko Kubota, Kanagawa (JP); Tsubasa Endo, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 7 days.

(21) Appl. No.: 16/071,216

(22) PCT Filed: Sep. 29, 2016

(86) PCT No.: PCT/JP2016/078897
§ 371 (c)(1),
(2) Date: Jul. 19, 2018

(87) PCT Pub. No.: WO2017/126166
PCT Pub. Date: Jul. 27, 2017

(65) Prior Publication Data
US 2019/0353107 A1    Nov. 21, 2019

(30) Foreign Application Priority Data
Jan. 22, 2016    (JP) .................................. 2016-010527

(51) Int. Cl.
| | | |
|---|---|---|
| *F02D 41/00* | (2006.01) | |
| *F02D 41/24* | (2006.01) | |
| *F02B 37/16* | (2006.01) | |
| *F16K 31/04* | (2006.01) | |
| *F02B 37/18* | (2006.01) | |
| *F02D 41/20* | (2006.01) | |

(52) U.S. Cl.
CPC .......... *F02D 41/0007* (2013.01); *F02B 37/16* (2013.01); *F02B 37/186* (2013.01);
(Continued)

(58) Field of Classification Search
CPC ............. F02D 41/0007; F02D 41/2438; F02D 41/2464; F02D 41/248; F02D 41/062;
(Continued)

(56) References Cited

U.S. PATENT DOCUMENTS 4,197,711 A * 4/1980 Fuhrmann ............... F02B 37/18
60/602
4,387,572 A * 6/1983 Richardson ........... F02B 37/164
60/602

(Continued)

FOREIGN PATENT DOCUMENTS

DE    10 2010 038 908 A1    2/2012
EP         0 376 493 A1     7/1990
(Continued)

*Primary Examiner* — Thai Ba Trieu
*Assistant Examiner* — Dapinder Singh
(74) *Attorney, Agent, or Firm* — Foley & Lardner LLP (57) ABSTRACT

When a waste gate valve (7) is forcibly fully closed for learning control at the time of start, the drive force of an electric actuator (20) is initially set to a large first level, and when a predetermined position (L1) immediately before seating is reached, the driving force is reduced to a second level. As a result, a valve body (7a) is gently seated. When a predetermined time (TM1) passes, the driving force is increased to a third level. Consequently, the electric actuator (20) presses the valve body (7a) onto a seat surface (34a) while displacing a spring member (37). As a result, a reliable sealability is obtained.

13 Claims, 4 Drawing Sheets

(52) U.S. Cl.
CPC ..... *F02D 41/2438* (2013.01); *F02D 41/2464* (2013.01); *F16K 31/042* (2013.01); *F16K 31/043* (2013.01); *F02D 2041/2027* (2013.01); *F02D 2250/16* (2013.01)

(58) Field of Classification Search
CPC ......... F02D 2250/16; F02D 2041/2027; F02B 37/16; F02B 37/186; F16K 31/042; F16K 31/043; Y02T 10/144
USPC ........................................ 60/605.2, 602, 600
See application file for complete search history.

(56) References Cited

U.S. PATENT DOCUMENTS

| | | | |
|---|---|---|---|
| 8,424,978 | B2 | 4/2013 | Landesfeind et al. |
| 9,464,565 | B2 | 10/2016 | Yamaguchi et al. |
| 2011/0173974 | A1* | 7/2011 | Grabowska ........... F01D 17/105 60/602 |
| 2014/0060041 | A1 | 3/2014 | Makino et al. |
| 2014/0322046 | A1 | 10/2014 | Yamaguchi et al. |
| 2015/0240707 | A1* | 8/2015 | Wang ..................... F02B 37/16 60/602 |

FOREIGN PATENT DOCUMENTS

| | | |
|---|---|---|
| JP | 2-230702 A | 9/1990 |
| JP | 2001-193507 A | 7/2001 |
| JP | 2009-517604 A | 4/2009 |
| JP | 2014-058894 A | 4/2014 |
| JP | 2014-231829 A | 12/2014 |
| JP | 2015-500955 A | 1/2015 |
| JP | 2015-048837 A | 3/2015 |

* cited by examiner

WASTE GATE VALVE CONTROL METHOD AND CONTROL DEVICE

TECHNICAL FIELD

This invention relates to valve opening control of a waste gate valve which is provided to a turbocharger.

BACKGROUND TECHNOLOGY

In general, a turbocharger used for supercharging of an internal combustion engine is provided with a waste gate valve at a turbine part which is configured so as to bypass a part of exhaust flow without passing through a turbine wheel, for supercharging pressure control. In a patent document 1, as a driving mechanism for the open/close driving of the waste gate valve, a so-called swing type mechanism is disclosed in which the linear motion of a rod of an electric actuator is converted to the rotational motion of a rotation shaft through a link and then a poppet type valve body which is supported on the distal end of an arm fixed to the rotation shaft oscillates.

In such the above waste gate valve, as described in the patent document 1, a small clearance exists between the distal end of the arm and the valve body which oscillate interlocking with the actuator, and it becomes a factor of the occurrence of abnormal sound. This abnormal sound can be suppressed by interposing a spring member, such as a conical washer, into the clearance. However, since the clearance has a function to bring the valve body into tight contact with a seat surface with a small degree of freedom to the posture of the valve body when the valve body is seated on the seat surface, by interposing the spring member, sealability at the time of full closing is reduced.

PRIOR ART REFERENCE

Patent Document

Patent Document 1: Japanese Patent Application Publication 2015-48837

SUMMARY OF THE INVENTION

The present invention is one configured to perform a process when a waste gate valve is closed from an opening state to a full closing position, wherein, the process includes increasing the driving force of an actuator in a stage in which a valve body is locally seated.

Therefore, by increasing the driving force after the valve body is locally seated, the valve body becomes in a state of coming in tight contact with a seat surface, while displacing a spring member.

According to the present invention, it is possible to suppress the reduction of sealability at the time of full closing caused by interposing the spring member to suppress abnormal sound of a waste gate valve.

MODE FOR IMPLEMENTING THE INVENTION

In the following, an embodiment of the present invention will be explained in detail based on the drawings.

Figure 1:
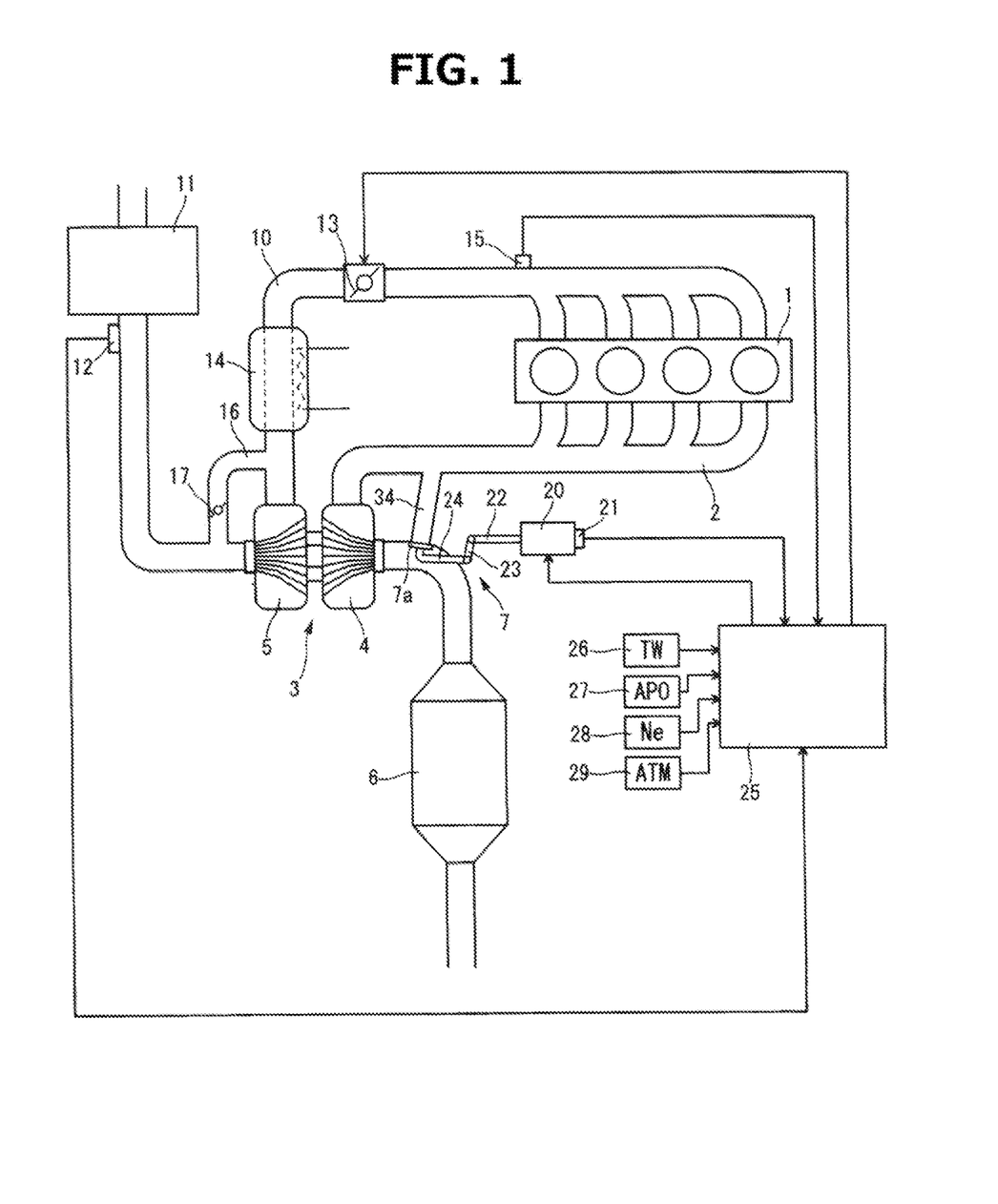
FIG. 1 is an explanatory drawing showing a system configuration of an embodiment of the present invention.

FIG. 1 is a schematic explanatory drawing showing the system configuration of an embodiment of the present invention. An exhaust passage 2 of an internal combustion engine 1 that is a spark ignition type gasoline engine is disposed with an exhaust gas turbine 4 of a turbocharger 3, and on its downstream side, a catalyst converter 6 in which, for example, a three way catalyst is used is disposed. An exhaust muffler which is not shown in the drawings is provided on the further downstream side of exhaust passage 2, and exhaust passage 2 is opened outside via the exhaust muffler. Exhaust gas turbine 4 is provided with a waste gate valve 7 for supercharging pressure control. In addition, internal combustion engine 1 has, for example, a direct injection type configuration, and a fuel injection valve for injecting fuel into cylinders, which is not shown in the drawings, is provided in each cylinder, and an ignition plug which is not shown in the drawings is provided in each of the cylinders. Internal combustion engine 1 is not limited to the direct injection type, and may be a port injection type fuel injection device.

An intake passage 10 of internal combustion engine 1 is disposed with an air cleaner 11, an air flow meter 12 and a throttle valve 13 arranged in this order from the upstream side. A compressor 5 of turbocharger 3 is disposed between air flow meter 12 and throttle valve 13. In addition, in the embodiment shown in the drawing, a water-cooled type or an air-cooled type intercooler 14 is interposed between compressor 5 and throttle valve 13, Moreover, intake passage 10 is provided with a recirculation passage 16 which communicates between the upstream side and the downstream side of compressor 5. This recirculation passage 16 is provided with a recirculation valve 17. This recirculation valve 17 has a function of circulating intake air by opening the valve at the time of deceleration when throttle valve 13 is suddenly closed.

A supercharging pressure sensor 15 for detecting supercharging pressure is disposed on the downstream side of throttle valve 13 of intake passage 10.

Waste gate valve 7 has a configuration in which the opening degree of waste gate valve 7 is controlled by an electric actuator 20, and a position sensor 21 is included in electric actuator 20 to detect an actual opening degree. Specifically, electric actuator 20 outputs the rotation of an electric motor as the movement in the axial direction of a rod 22 by a ball screw mechanism, and position sensor 21 detects the axial direction position of rod 22 with respect to the case of the actuator. Rod 22 is linked to a poppet type valve body 7a of waste gate valve 7 via a link 23 and an arm 24.

The operation of electric actuator 20 is controlled by an engine controller 25 which performs various kinds of control of internal combustion engine 1. In addition to the detection signals of supercharging pressure sensor 15 and position sensor 21, detection signals of sensors, such as a cooling water temperature sensor 26 which detects a cooling water temperature TW of internal combustion engine 1, an accelerator opening degree sensor 27 which detects an accelerator depressing amount which is not shown in the drawings, that is, an accelerator opening degree APO, a crank angle sensor 28 which detects a rotation speed Ne of internal combustion engine 1 and an atmospheric pressure sensor 29 which detects an atmospheric pressure ATM, are input to engine controller 25. The opening degree of throttle valve 13, the fuel injection amount of the fuel injection valves which are not shown in the drawings and the ignition timing of the ignition plugs which are not shown in the drawings are also controlled by engine controller 25.

Figure 2:
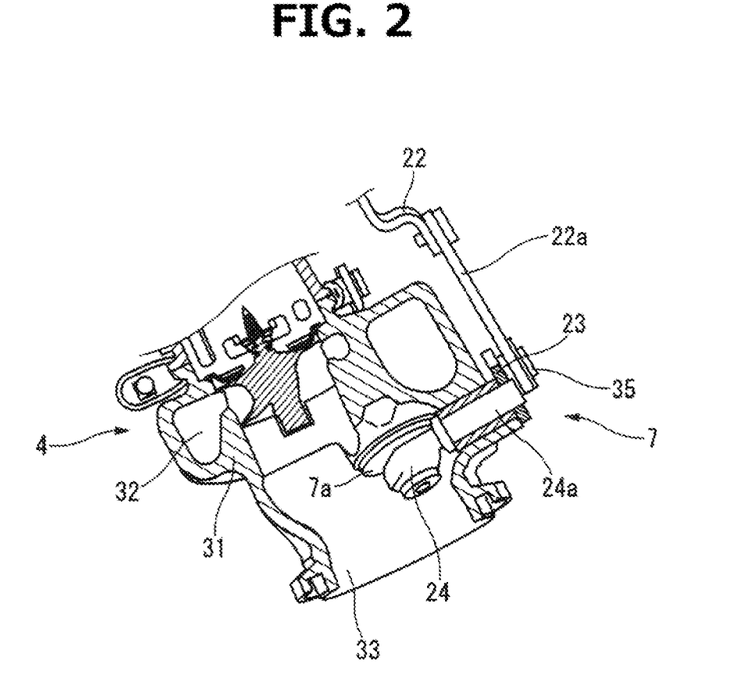
FIG. 2 is a sectional view showing a main part of a turbocharger.

FIG. 2 shows a more specific configuration example of waste gate valve 7 provided to exhaust gas turbine 4 of turbocharger 3. As shown in the drawing, valve body 7a of waste gate valve 7 is positioned at an exhaust outlet portion 33 of a turbine housing 31 having a scroll portion 32, and is configured to open and close a bypass passage 34 (schematically shown in FIG. 1) from exhaust outlet portion 33 side, which communicates the upstream side part of scroll portion 32 with exhaust outlet portion 33. This waste gate valve 7 has a so-called swing type configuration, and valve body 7a is supported on the distal end of arm 24 having a shaft portion 24a. Shaft portion 24a is rotatably supported on turbine housing 31, and one end of link 23 is fixed to the base end of shaft portion 24a which is exposed to the outer surface of turbine housing 31. Rod 22 of electric actuator 20, for detail, an intermediate rod 22a is connected to the other end of link 23 via a pin 35. The basic configuration of the swing type waste gate valve is publicly known by, for example, Japanese Patent Application Publication No. 2014-58894. In this configuration, arm 24 oscillates with shaft portion 24a as a center by the axial direction movement of rod 22 of electric actuator 20, and with this, circular valve body 7a opens and closes the distal end opening of bypass passage 34.

Figure 3:
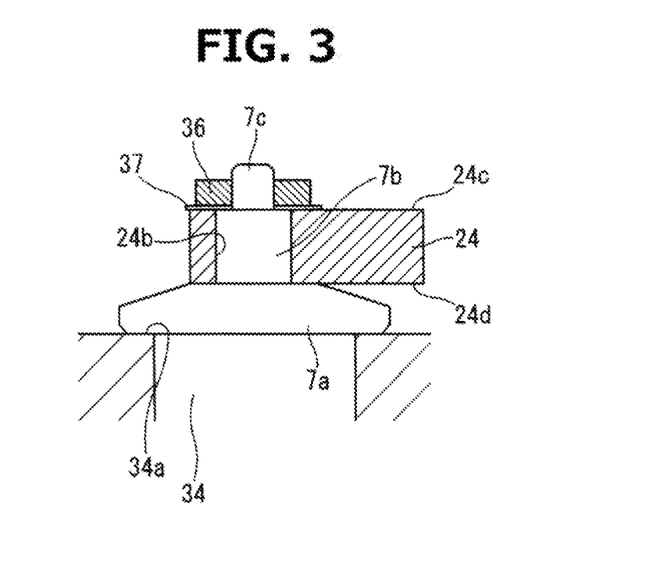
FIG. 3 is a main part enlarged view showing a valve body attachment structure of a waste gate valve.

FIG. 3 shows an example of the attachment structure of valve body 7a in the distal end of arm 24. As shown in the drawing, a shaft portion 7b in the center of valve body 7a penetrates an attachment hole 24b of arm 24, and is prevented from coming out by attaching a ring-shaped fixing member 36 to a small diameter portion 7c at the distal end of shaft portion 7b. In addition, as a spring member, a ring-shaped conical washer 37 having a gentle taper is interposed between fixing member 36 and an upper surface 24c of arm 24 in a state of being compressed. That is, if a spring member, such as conical washer 37, is not equipped, there is possibility that abnormal sound occurs due to the vibration of valve body 7a caused by small clearances existing between arm 24 and valve body 7a and between shaft portion 7b and the inner circumferential surface of attachment hole 24. In contrast to this, in the configuration of the above embodiment, valve body 7a is pressed toward a lower surface 24d of arm 24 by the spring force of conical washer 37, and thereby the abnormal sound caused by the vibration can be suppressed.

On the other hand, as explained above, if valve body 7a is substantially fixed to arm 24 by a spring member, such as conical washer 37, sealability to a seat surface 34a of the circumference of the opening of bypass passage 34 deteriorates, because the degree of freedom of valve body 7a deteriorates. In the present embodiment, the deterioration of the sealability is compensated by changing the driving force of electric actuator 20.

Next, with reference to FIG. 4 to FIG. 7, the opening degree control of waste gate valve 7 in the above embodiment will be explained.

Figure 4:
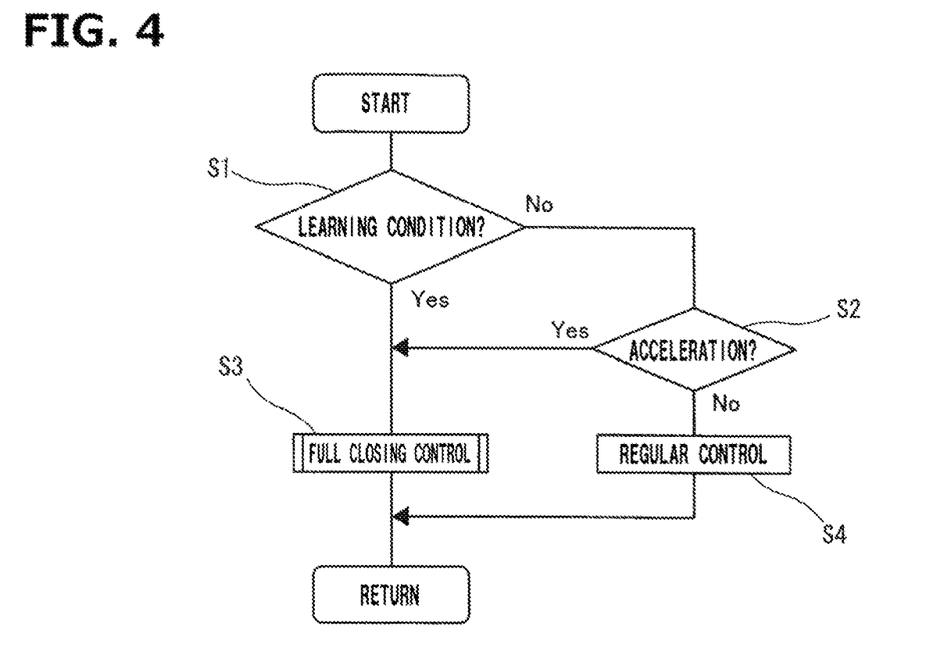
FIG. 4 is a flow chart showing a flow of control of an embodiment.

FIG. 4 is a flow chart showing a flow of the process of the opening degree control of waste gate valve 7 which is executed by the above engine controller 25 that corresponds to a control section. In a step 1, it is judged whether or not a condition to perform the learning of position sensor 21 in the full closing position of waste gate valve 7 is satisfied. At each time of the start of internal combustion engine 1, this learning is executed after the start. If the judgement is "YES", the process proceeds to a step 3, and the opening degree of waste gate valve 7 is forcibly controlled to be fully closed as an open loop control unrelated to the supercharging pressure. In this way, in a state in which the opening degree of waste gate valve 7 is physically controlled to be fully closed, the learning of a detection value of position sensor 21 is performed.

When the learning of the full closing position of position sensor 21 is finished, the judgement of step 1 becomes "NO". In this case, the process proceeds from step 1 to a step 2, and by a change in accelerator opening degree APO, it is judged whether or not the engine is in a sudden acceleration state. If the judgement is "YES", the process proceeds from step 2 to a step 3, and the opening degree of waste gate valve 7 is forcibly controlled to be fully closed as an open loop control unrelated to the supercharging pressure. With this, the responsiveness of the supercharging at the time when acceleration is required, that is, the rise of torque is improved. In addition, the forcible full closing control at the time of this sudden acceleration is released after the elapse of an extremely short fixed time from acceleration start.

Figure 6:
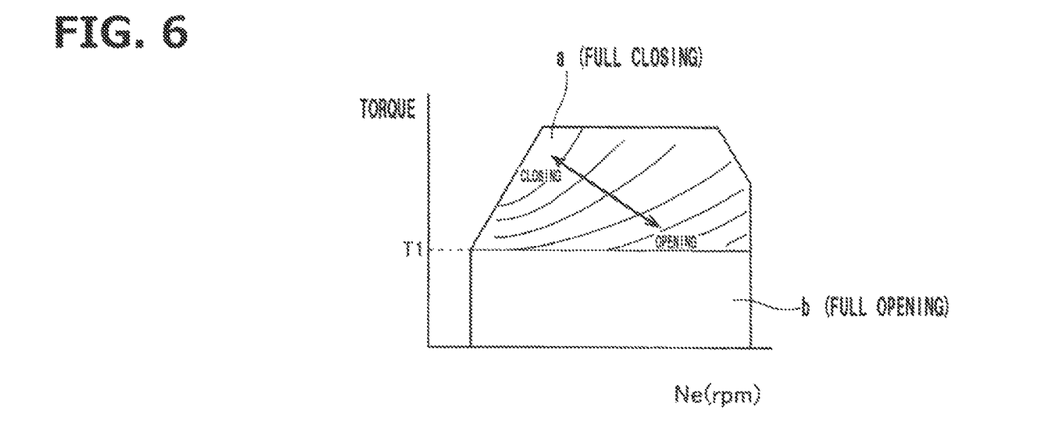
FIG. 6 is a characteristic diagram showing features of a waste gate valve opening degree to an engine operation condition.

If the judgement in step 2 is "NO", the process proceeds from step 2 to a step 4, and a regular valve opening control by a feedback control system for supercharging pressure control (in other words, torque control) is executed. In FIG. 6, a feature of the opening degree of waste gate valve 7 to an engine rotation speed and a torque is shown in a contour line shape. In an area "a" in which a load is high and the rotation speed is low, waste gate valve 7 is fully closed, and as shown by an arrow, the opening degree of waste gate valve 7 is increased more as the load becomes lower and the rotation speed becomes higher from the area "a" toward the right lower side of the figure. In this way, the area in which the opening degree of waste gate valve 7 is continuously changed is a so-called supercharging area, and by the opening control of waste gate valve 7, the torque of internal combustion engine 1 is controlled, while the opening degree of throttle valve 13 is basically set to full opening. In a lower load area "b" than a predetermined torque T1, waste gate valve 7 becomes full opening. In this area "b", the supercharging is not substantially performed, and as a non-supercharging area, that is, a natural intake area, by the opening degree of throttle valve 13, the torque is controlled. More specifically, a target supercharging pressure (more strictly, a target pressure ratio) is given by a predetermined control map based on the engine rotation speed and a required torque, and to achieve this target, the target opening degree of waste gate valve 7 is feedback-controlled by using the detection signal of supercharging pressure sensor 15. As a result of this supercharging pressure feedback control, an opening degree feature shown in FIG. 6 can be obtained. In addition, in this regular control, electric actuator 20 is feedback-controlled based on the deviation of the above target opening degree and the opening degree detected by position sensor 21.

In this way, during the operation of internal combustion engine 1, the opening degree of waste gate valve 7 is basically feedback-controlled based on the supercharging pressure detected by supercharging pressure sensor 15 for the supercharging pressure control. When executing the learning of position sensor 21 at the time of the sudden acceleration and immediately after the start, by the open loop control, the target opening degree becomes full closing, and waste gate valve 7 is forcibly controlled to the full closing position.

Figure 5:
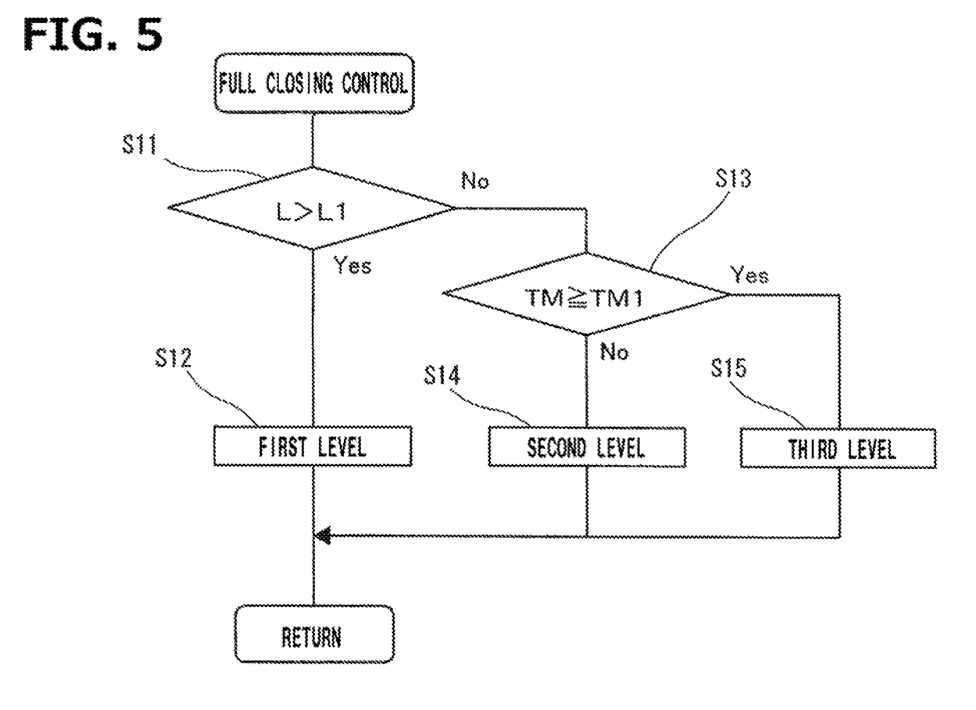
FIG. 5 is a flow chart showing a flow of a process of full closing control.

FIG. 5 shows details of the process of the forcible full closing control in the above step 3. Since the target opening degree is changed from the full opening or intermediate opening to the full closing, electric actuator 20 is driven toward the closing direction of valve body 7a. In a step 11, it is judged whether a position L of valve body 7a is larger than a predetermined position L1 or not. Here, for example, the position of rod 22 (the position detected by position sensor 21) when valve body 7a is full closing is set to 0 point as a reference point, and position L and predetermined position L1 of valve body 7a are shown by a stroke amount of rod 22 from this 0 pint toward an opening direction. That is, the larger the value L is, the further valve body 7a is away from seat surface 34a. In addition, predetermined position L1 is set to a position immediately before the seating of valve body 7a on seat surface 34a.

The judgement of step 11 is "YES" until position L reaches predetermined position L1, while valve body 7a is changed from the full opening or the intermediate opening to the full closing. In this case, the process proceeds to a step 12, and the driving force of electric actuator 20 (in other words, the thrust of rod 22) is set to a first level in which the driving force is relatively large. Here, in the above embodiment, the driving force of electric actuator 20 is determined by ON-duty of a driving pulse signal given to an electric motor. In step 12, electric actuator 20 is therefore driven by a relatively high ON-duty.

When position L of valve body 7a reaches predetermined position L1, the judgement in step 11 becomes "NO". In this case, the process proceeds from step 11 to a step 13, and it is judged whether or not an elapsed time TM after reaching predetermined position L1 is equal to a predetermined time TM or more. Until predetermined time TM1 passes, the process proceeds from step 13 to a step 14, and the driving force of electric actuator 20 is set to a second level in which the driving force is smaller than that in the first level. That is, in step 14, by a relatively small ON-duty, electric actuator 20 is driven.

When elapsed time TM after reaching predetermined position L1 reaches predetermined time TM1, the process proceeds from step 13 to a step 15, the driving force of electric actuator 20 is set to a third level 3 at which the driving force is larger than that in the second level. Here, the driving force in the third level is required to have at least a force enough to cause the displacement of conical washer 37 that is a spring member. In addition, to avoid the electric motor from being excessively energized, it is preferable that the driving force in the third level is lower than that in the first level. Accordingly, in step 15, by an ON-duty that is smaller than the ON-duty corresponding to the first level and that is larger than the ON-duty at the second level, electric actuator 20 is driven.

Figure 7:
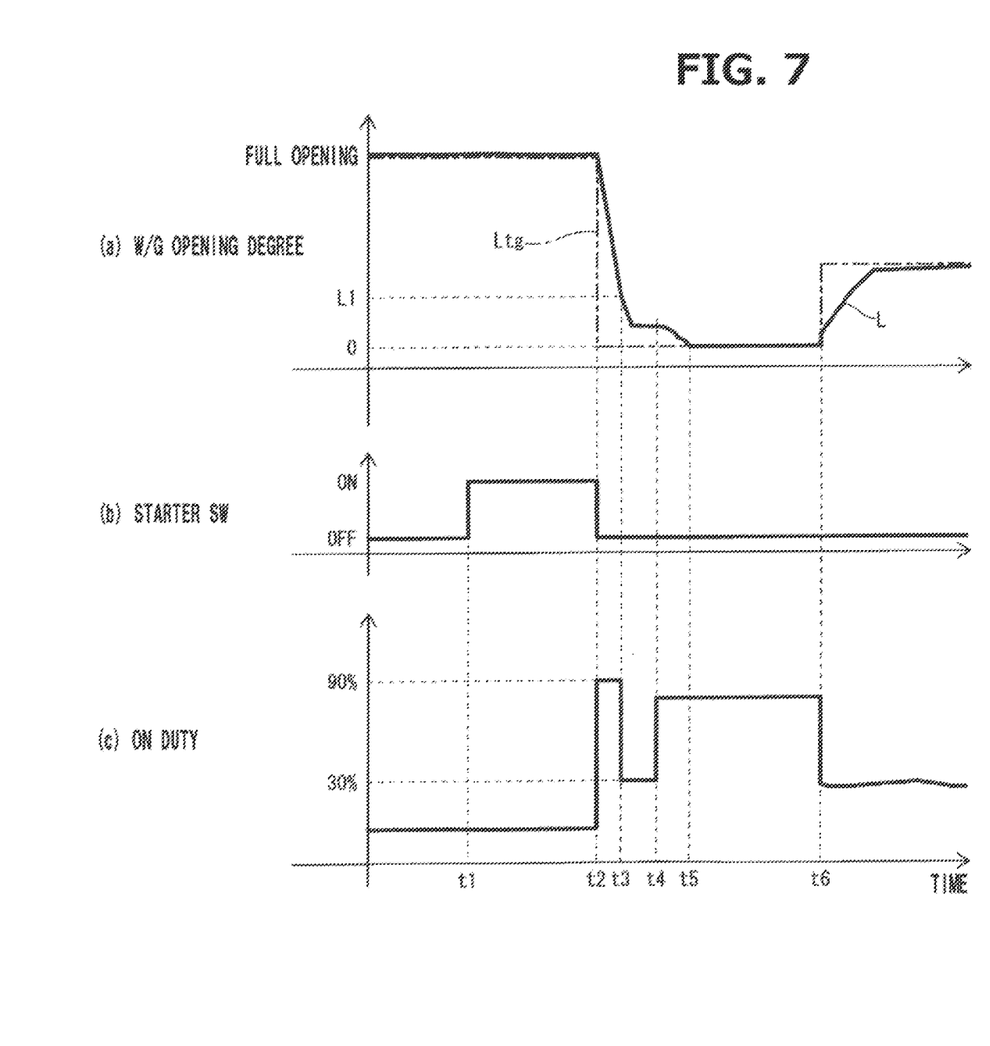
FIG. 7 is a time chart showing an operation at the time of the full closing control immediately after engine start.

FIG. 7 is a time chart at the time of the full closing control immediately after the start, as an example of forcible full closing control, and comparatively shows changes in (a) the opening degree of waste gate valve 7 (the stroke amount of rod 22 of electric actuator 20), (b) the starter switch of internal combustion engine 1 and (c) the ON-duty of the driving pulse signal given to electric actuator 20.

At a time t1, the starter switch is switched to "ON" by the operation of a driver, and cranking is started. At a time t2, internal combustion engine 1 is started, and the starter switch is switched to "OFF". In this way, at the time of completing the start, the learning of position sensor 21 is started, and the opening degree indicated by a reference sign Ltg is changed stepwise to "0" that corresponds to the full closing position by the open loop control. In addition, before starting internal combustion engine 1, the waste gate valve 7 is fully opened, and also target opening degree Ltg is full opening during the cranking.

In correspondence with the change of target opening degree Ltg at time t2, electric actuator 20 is driven in a closing direction. However, the driving force in this time is set to the highest first level, and, for example, electric actuator 20 is driven by 90% of the ON-duty driving signal. With this, as shown by a solid line, position L of valve body 7a is rapidly reduced.

At a time t3, position L of valve body 7a reaches predetermined position L1, and with this, the driving force of electric actuator 20 is reduced to the second level. For example, it becomes 30% of the ON-duty. Consequently, the moving speed of valve body 7a is reduced, and valve body 7a is gently seated without strongly colliding with seat surface 34a. The degree of the driving force, that is, the degree of the thrust force of rod 22 at this time becomes a degree to which valve body 7a cannot be moved any more, when a part of valve body 7a is locally seated to seat surface 34a. By a variation in posture of valve body 7a to seat surface 34a, in many cases, valve body 7a therefore becomes a state in which a part of thereof is locally seated.

At a time t4 after predetermined time TIM passes from time t3 at which position L reaches predetermined position L1, the driving force of electric actuator 20 is increased to the third level. For example, the ON-duty is increased to 70%. Consequently, valve body 7a which is locally seated is further pressed toward seat surface 34a. Therefore, even in case where a part of valve body 7a is floated from seat surface 34a, valve body 7a is pressed to seat surface 34a while displacing conical washer 37, and the entire periphery of valve body 7a comes in tight contact with seat surface 34a. A reliable sealability is, as result, obtained. In the embodiment shown in the drawing, at a time t5, valve body 7a becomes in a state of sufficiently coming in tight contact with seat surface 34a.

In this way, in the state in which valve body 7a is sufficiently seated on seat surface 34a, the learning of the full closing position of valve body 7a is executed. At a time t6, the learning control is completed, and the forcible full closing control is finished. With this, target opening degree Ltg is changed to an opening degree in correspondence with a condition at that time.

Although, FIG. 7 shows a change in the driving force at the time of the full closing control for the learning control immediately after the start, the forcible full closing control at the time of the sudden acceleration is also the same.

In this way, when valve body 7a is driven to the full closing, the driving force is set to the first level in an initial period, and by reducing the driving force from the first level to the second level in the stage of reaching predetermined position L1, valve body 7a is quickly closed, and at the same time of this, valve body 7a can be avoided from colliding with seat surface 34a, and thereby it can be seated gently. In a state of being locally seated, by increasing the driving force from the second level to the third level, a reliable sealability can be obtained, regardless of the interposing of the spring member (conical washer 37) used for the suppression of abnormal sound. Therefore, both of the suppression of the abnormal sound by conical washer 37 and the securing of the sealability at the time of the full closing can be achieved.

In addition, in the above embodiment, since the ON-duty in the third level is set lower than the ON-duty in the first level, it is possible to avoid the electric motor from being excessively energized.

Moreover, in the above embodiment, since actual position L of valve body 7a is detected by position sensor 21 and based on this, the reduction from the first level to the second revel is performed, the speed of valve body 7a at the time of the closing can be properly controlled, and the gentle seating can be always surely obtained.

Furthermore, in the above embodiment, since the timing at which the driving force is increased from the second level to the third level is judged based on elapsed time TM after reaching valve body 7a to predetermined position L1, it is not affected by a variation in position L of valve body 7a at the time of the local seat of valve body 7a.

In addition, in the above embodiment, although a spark ignition type internal combustion engine has been explained as an example, the present invention can be similarly applied to a turbocharger for a diesel engine.

In addition, in the above embodiment, although a conical washer is used as a spring member, it is not limited to this, and one having elasticity can be used, washers such as a wave washer and a G-type spring washer can be also used.

The invention claimed is:

1. A waste gate valve control method for a waste gate valve provided to a turbocharger, wherein the waste gate valve comprises: an actuator; an arm which is driven by the actuator and which oscillates with a rotation center as a center; a valve body which is supported on a distal end of the arm; and a spring member which is interposed between the arm and the valve body, the waste gate valve control method comprising:
performing a process, by a controller, when the waste gate valve is closed from an opening state to a full closing position, wherein the process comprises:
causing a reduction of a driving force of the actuator from a first level to a second level, responsive to a sensor detecting that the valve body during movement in a closing direction reaches a predetermined position immediately before seating; and
causing an increase of the driving force from the second level to a third level in a stage in which the valve body is locally seated.

2. The waste gate valve control method according to claim 1, wherein the third level is a driving force level in which the spring member is displaced.

3. The waste gate valve control method according to claim 1, wherein when the valve body reaches the predetermined position and a predetermined time passes, the valve body is judged to be locally seated, and the driving force is increased from the second level to the third level.

4. The waste gate valve control method according to claim 1, wherein the driving force in the third level is set smaller than that in the first level.

5. The waste gate valve control method according to claim 1, wherein a feedback control of an opening degree of the waste gate valve based on a detection of supercharging pressure is included, and an open loop control is included in which the opening degree of the waste gate valve is set to full closing regardless of the supercharging pressure at a time of a predetermined condition, and
wherein a change in the driving force is executed at a time of full closing operation by the open loop control.

6. A waste gate valve control method for a waste gate valve which is provided to a turbocharger, wherein the waste gate valve comprises: an actuator; an arm which is driven by the actuator and which oscillates with a rotation center as a center; a valve body which is supported on a distal end of the arm; and a spring member which is interposed between the arm and the valve body, the waste gate valve control method comprising:
performing, by a controller, a process when the waste gate valve is closed from an opening state to a full closing position, wherein the process comprises:
causing a reduction of a driving force of the actuator from a first level to a second level, responsive to a sensor detecting that the valve body reaches a predetermined position immediately before seating; and
causing an increase of the driving force from the second level to a third level that is a driving force level in which the spring member is displaced, in a stage in which the valve body is locally seated.

7. The waste gate valve control method according to claim 6, wherein the driving force in the third level is set smaller than that in the first level.

8. The waste gate valve control method according to claim 6, wherein a feedback control of an opening degree of the waste gate valve based on a detection of supercharging pressure is included, and an open loop control is included in which the opening degree of the waste gate valve is set to full closing regardless of the supercharging pressure at a time of a predetermined condition, and
wherein a change in the driving force is executed at a time of full closing operation by the open loop control.

9. A waste gate valve control method for a waste gate valve which is provided to a turbocharger, wherein the waste gate valve comprises: an actuator; an arm which is driven by the actuator and which oscillates with a rotation center as a center; a valve body which is supported on a distal end of the arm; and a spring member which is interposed between the arm and the valve body, the waste gate valve control method comprising:
performing, by a controller, a process when the waste gate valve is closed from an opening state to a full closing position, wherein the process comprises:
detecting that the valve body reaches a predetermined position immediately before seating by a sensor; and
causing an increase of a driving force of the actuator such that an entire periphery of the valve body comes in tight contact with a seat surface, in a stage in which the valve body is locally seated.

10. The waste gate valve control method according to claim 9, wherein a feedback control of an opening degree of the waste gate valve based on a detection of supercharging pressure is included, and an open loop control is included in which the opening degree of the waste gate valve is set to full closing regardless of the supercharging pressure at a time of a predetermined condition, and
wherein a change in the driving force is executed at a time of full closing operation by the open loop control.

11. A waste gate valve control device comprising:
a turbocharger;
a waste gate valve including: an actuator; an arm which is driven by the actuator and which oscillates with a rotation center as a center; a valve body which is supported on a distal end of the arm; and a spring member which is interposed between the arm and the valve body; and an engine controller, wherein the engine controller is configured to:

responsive to a command to close the waste gate valve from an opening state to a full closing position, set a driving force of the actuator to a first level and operate the actuator in a closing direction, reduce the driving force of the actuator from the first level to a second level, responsive to a sensor detecting that the valve body during movement in the closing direction reaches a predetermined position immediately before seating, and increase the driving force from the second level to a third level, in a stage in which the valve body is locally seated.

12. A waste gate valve control device comprising:
a turbocharger;
a waste gate valve including: an actuator; an arm which is driven by the actuator and which oscillates with a rotation center as a center; a valve body which is supported on a distal end of the arm; and a spring member which is interposed between the arm and the valve body; and
an engine controller, wherein the engine controller is configured to:

responsive to a command to close the waste gate valve from an opening state to a full closing position, set a driving force of the actuator to a first level and operate the actuator in a closing direction, reduce the driving force of the actuator from the first level to a second level, responsive to a sensor detecting that the valve body reaches a predetermined position immediately before seating, and increase the driving force from the second level to a third level that is a driving force level in which the spring member is displaced, in a stage in which the valve body is locally seated.

13. A waste gate valve control device comprising:
a turbocharger;
a waste gate valve including: an actuator; an arm which is driven by the actuator and which oscillates with a rotation center as a center; a valve body which is supported on a distal end of the arm; and a spring member which is interposed between the arm and the valve body; and
an engine controller, wherein the engine controller is configured to:

responsive to a command to close the waste gate valve from an opening state to a full closing position, set a driving force of the actuator to a first level and operate the actuator in a closing direction, reduce the driving force of the actuator from the first level to a second level, responsive to a sensor detecting that the valve body reaches a predetermined position immediately before seating, and increase the driving force of the actuator from the second level to a third level such that an entire periphery of the valve body comes in tight contact with a seat surface, in a stage in which the valve body is locally seated.

\* \* \* \* \*